(12) United States Patent
Weisenfeld

(10) Patent No.: US 7,243,825 B2
(45) Date of Patent: Jul. 17, 2007

(54) BAG HOLDER

(76) Inventor: Neil Lawrence Weisenfeld, 66 - 23 242 St., Apt 2R, Little Neck, NY (US) 11362

( * ) Notice: Subject to any disclaimer, the term of this patent is extended or adjusted under 35 U.S.C. 154(b) by 90 days.

(21) Appl. No.: 11/091,169

(22) Filed: Mar. 28, 2005

(65) Prior Publication Data

US 2006/0226303 A1 Oct. 12, 2006

(51) Int. Cl.
B60R 7/00 (2006.01)

(52) U.S. Cl. ............... 224/311; 224/572; 224/925; 248/95

(58) Field of Classification Search .......... 248/95; 224/311, 309, 572, 925; 24/298, 302; 410/96, 410/97, 100
See application file for complete search history.

(56) References Cited

U.S. PATENT DOCUMENTS

| | | | | |
|---|---|---|---|---|
| 1,494,233 A | * | 5/1924 | Fudge | 24/298 |
| 1,696,029 A | * | 12/1928 | Chandler | 224/311 |
| 3,170,206 A | * | 2/1965 | Triplett | 24/298 |
| 3,416,762 A | * | 12/1968 | Headrick | 410/85 |
| 3,953,911 A | * | 5/1976 | Fishack | 24/16 R |
| 4,029,244 A | | 6/1977 | Roberts | |
| 4,147,353 A | * | 4/1979 | Moore | 473/575 |
| 4,226,348 A | | 10/1980 | Dottor et al. | |
| 4,660,835 A | * | 4/1987 | Locurto | 473/147 |
| 5,050,825 A | | 9/1991 | Bratset | |
| 5,083,797 A | * | 1/1992 | Vartija et al. | 473/424 |
| 5,287,971 A | | 2/1994 | Dorman | |
| 5,339,497 A | * | 8/1994 | Serlachius | 24/129 R |
| 5,340,004 A | * | 8/1994 | Moore | 224/563 |
| 5,401,034 A | * | 3/1995 | Mallinger | 473/576 |
| 5,427,288 A | | 6/1995 | Trubee | |
| 5,464,102 A | | 11/1995 | LeBlanc et al. | |
| 5,551,379 A | * | 9/1996 | Hart | 119/771 |
| 5,611,540 A | * | 3/1997 | Williams et al. | 473/429 |
| 5,676,178 A | * | 10/1997 | Ehnimb | 139/384 R |
| 5,718,190 A | * | 2/1998 | Tinker | 119/771 |
| 5,800,106 A | * | 9/1998 | Miller | 410/117 |
| 5,829,392 A | * | 11/1998 | Coleman | 119/795 |
| 5,901,668 A | * | 5/1999 | Goodger, Sr. | 119/795 |
| 6,029,611 A | * | 2/2000 | Hershauer | 119/771 |
| 6,030,160 A | * | 2/2000 | Moore | 410/118 |
| 6,129,253 A | * | 10/2000 | Brown | 224/545 |
| 6,142,889 A | * | 11/2000 | Schaubach | 473/426 |
| 6,149,040 A | | 11/2000 | Walker | |
| 6,334,562 B1 | * | 1/2002 | Ament et al. | 224/563 |
| 6,367,746 B1 | | 4/2002 | Webb et al. | |
| 6,368,241 B1 | * | 4/2002 | Abel | 473/508 |
| 6,490,767 B2 | * | 12/2002 | Haiduk | 24/298 |
| 6,502,731 B1 | | 1/2003 | Gehring et al. | |
| 6,637,077 B2 | * | 10/2003 | Doty | 24/302 |
| 6,669,067 B2 | | 12/2003 | Schuster | |
| 6,685,582 B2 | * | 2/2004 | Abel | 473/508 |

(Continued)

Primary Examiner—Carl D. Friedman
Assistant Examiner—Bradley Duckworth

(57) ABSTRACT

A bag holder for use in a vehicle trunk comprising a trunk lid having trunk hinges which attach the trunk lid to the vehicle. The bag holder device comprises a band portion having two ends, the band portion being at least partially elastically stretchable and of sufficient length when the partially elastically stretchable portion is partially stretched so as to be held in tension when the ends are connected to respective trunk hinges. The ends of the band portion are connected by connection means to slideable hinge rings, each of the slideable hinge rings having a sufficient circumference so as to permit encircling of the trunk hinges.

18 Claims, 4 Drawing Sheets

U.S. PATENT DOCUMENTS

| | | |
|---|---|---|
| 6,701,873 B2 * | 3/2004 | Fradette, II .................. 119/784 |
| 6,702,317 B2 * | 3/2004 | Wang .......................... 280/727 |
| 6,899,256 B2 * | 5/2005 | Richter ....................... 224/311 |
| 6,908,269 B1 * | 6/2005 | Youngs et al. ............... 410/100 |
| 6,971,963 B2 * | 12/2005 | Abel ........................... 473/508 |
| 2002/0077020 A1 * | 6/2002 | Graf et al. ................... 446/227 |
| 2004/0124222 A1 * | 7/2004 | Richter ....................... 224/311 |

* cited by examiner

BAG HOLDER

FIELD OF THE INVENTION

This invention relates to the field of bag holders and in particular to devices designed for holding bags having handles when such bags, filled with items, are transported in a vehicle.

BACKGROUND OF THE INVENTION

Plastic "T-shirt" style shopping or grocery bags are widely used by retail establishments to package consumers purchases. The conventional T-shirt style grocery bag is made of thin plastic material with cutouts at the open end to form two handles for carrying the bag. These handles make the bag convenient for carrying items since the handles are readily accessible and the handles of several bags can be gripped together for carrying. Unlike a box or even a standard paper grocery bag, both of which have some degree of rigidity, the conventional T-shirt style grocery bag does not have the ability to maintain any shape apart from the shape of whatever items are placed in the bag. When transported in a vehicle, the items within T-shirt style grocery bags may shift position, roll around and come out of the bags.

A number of different inventions have been disclosed to address the need to secure items in grocery bags during transport.

The use of a fixed assembly having hooks to which the grocery bags are attached is disclosed in a number of patents. U.S. Pat. No. 5,287,971 issued Feb. 22, 1994 to Dorman discloses a bag holder comprising a rack installed in the trunk of a vehicle, with a raised horizontal bar from which grocery bags are suspended. The raised bar has a series of hooks anchored thereon at spaced positions to which the loaded bags are attached. U.S. Pat. No. 6,367,746 B1, issued Apr. 9, 2002 to Webb et al. discloses a bag holder with a plurality of hangers which form a rack. The grocery bag handles are placed over the hangers and held securely in place. The invention's design requires the bags be placed evenly around the assembly for stability. U.S. Pat. No. 5,427,288, issued Jun. 27, 1995 to Trubee discloses a grocery-bag holder rack for use in vehicles that consists of a horizontal rack upon which pluralities of hooks are disposed. The handles of the grocery bags are placed on the hooks during transport.

However, all of these devices, once installed in the vehicle trunk take up precious cargo space and cannot comfortably and functionally coexist with other cargo in the trunk area and must be removed to fully utilize the trunk space. Although the devices are removable, the user can only reclaim the cargo space if the device is removed at a location where it can be stored separately from the vehicle such as at home. If the trunk space is needed at a location away from home there may be no convenient option to store the grocery bag holder outside of the trunk. Also all the above-mentioned devices require each grocery bag to be individually attached to a hook, a process that is tedious and time consuming. In addition, the number of grocery bags that can be accommodated by such devices is limited to the number of hooks the device has.

A number of inventions address grocery bags in vehicles by implementing a type of rack into which the grocery bags are loaded. U.S. Pat. No. 6,149,040, issued Nov. 21, 2000 to Walker discloses a removable vehicle trunk organizer with multiple compartments. Similarly, U.S. Pat. No. 4,029,244, issued Jun. 14, 1977 to Roberts discloses a collapsible stand for transporting loaded grocery bags. U.S. Pat. No. 4,226,348, issued Sep. Oct. 7, 1980 to Dottor et al. discloses a collapsible trunk contained grocery bag holder.

However, all of these collapsible devices, while freeing trunk space, still take up significant space on the floor of the trunk compartment, even in the collapsed position. Also, the number of compartments limits the number of bags that can be accommodated by these devices. In addition, each bag must be individually loaded into each compartment, which is tedious and time consuming.

A number of inventions address securing grocery bags in vehicles by way of freestanding foldable apparatus onto which the grocery bag handles are draped. U.S. Pat. No. 5,050,825, issued Sep. 24, 1991 to Bratset discloses a grocery bag support having a base and upright members for the purpose of supporting a plurality of filled grocery bags. U.S. Pat. No. 5,464,102 issued Nov. 7, 1995 to LeBlanc et. al. discloses a foldable apparatus for transporting filled grocery bags in an upright position.

However, all of these devices suffer from similar limitations as the previously mentioned inventions in that they continue to take up trunk space even in the collapsed position; the number of upright members limits the number of bags that can be accommodated and the user must individually load bags on the upright members, a tedious and time consuming process.

Accordingly, it would be desirable to have a grocery bag holder that takes up little cargo area space when not being used.

Additionally, it would be desirable to have a grocery bag holder that can co-exist with other cargo at the same time that it is holding grocery bags.

Additionally, it would be desirable to have a grocery bag holder that is easily removed and can be stowed in a minimum of space when it is removed.

Additionally, it would be desirable to have a grocery bag holder that can hold a variable number of bags and is not limited to a defined number of bags by it's design or geometry.

Additionally, it would be desirable to have a grocery bag holder that can be adjusted to fit in the trunk of any car.

Additionally, it would be desirable to have a grocery bag holder that allows the user to load and remove the grocery bags in a single quick motion.

Further, it would be desirable to have a grocery bag holder that can be inexpensively and easily manufactured using commonly available materials.

SUMMARY OF THE INVENTION

A bag holder for use in a vehicle trunk comprising a trunk lid having trunk hinges which attach the trunk lid to the vehicle is disclosed. The bag holder device comprises a band portion having two ends, the band portion being at least partially elastically stretchable and of sufficient length when the partially elastically stretchable portion is partially stretched so as to be held in tension when the ends are connected to respective trunk hinges. The ends of the band portion are connected by connection means to slideable hinge rings, each of the slideable hinge rings having a sufficient circumference so as to permit encircling of the trunk hinges.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

The bag holder of the present invention is a device for use in an automobile cargo compartment, commonly referred to as the trunk. Trunks of automobiles have trunk lids that are attached by generally curved trunk hinges. The bag holder of the present invention is releasably attachable to the trunk hinges. In a preferred embodiment the bag holder is attached to connecting members that loosely encircle the trunk hinges so as to be slidable on the trunk hinge. Therefore, when the trunk lid is closed, the bag holder can slide into a different position relative to the trunk hinge.

The bag holder of the present invention is in the form of a band that can be at least partially stretchable so as to maintain a tensioned state when the ends of the band are constrained in a connected position. The connected position for the bag holder of the present invention is to have each of the two ends of the band connected to a portion of the hinges of an automobile trunk lid. The connection may be made directly or indirectly, depending upon the particular connection means utilized. Preferably the band is elastically stretchable, wherein upon stretching the band provides a restoring force to maintain tension in the band during use. By "band" as used herein is meant any of bands, straps, cords, belts, or other longitudinally-extending, flexible ropes, webs, or strips of material. The band material can comprise, for example, leather, cloth, elastic strands, synthetic fibers, natural fibers, woven materials, nonwoven materials, films, and the like.

In operation, the bag holder engages the bags to be held by threading the band portion through the bag handles. After the bags are threaded onto the bag holder, the two ends of the device can be attached to the trunk hinges, one end attached to one trunk hinge, and the other end attached to the other. A tensioning means, such as an elastic portion, or a belt tensioner, can be provided so that the bag holder maintains a certain amount of tension, thereby allowing adjustment for proper holding of the bags under varying conditions. For example, if only one bag is being held, the tension may be greater than if a plurality of bags is being held. Adjustment can be made before or after the bags are threaded onto the bag holder.

The bag holder of the present invention can be releasably attached to the trunk hinges by attachment mechanisms that permit rapid attachment and detachment. For example, various known clips, clasps, hooks, fasteners and other attachment devices can be known to hook the bag holder onto the trunk hinges, either directly or indirectly.

The bag holder of the present invention can be understood with reference to the following examples where preferred embodiments are illustrated. While specific features and elements are disclosed with respect to the examples below, these particulars are shown by way of example, and are not to be considered limiting.

Figure 1:
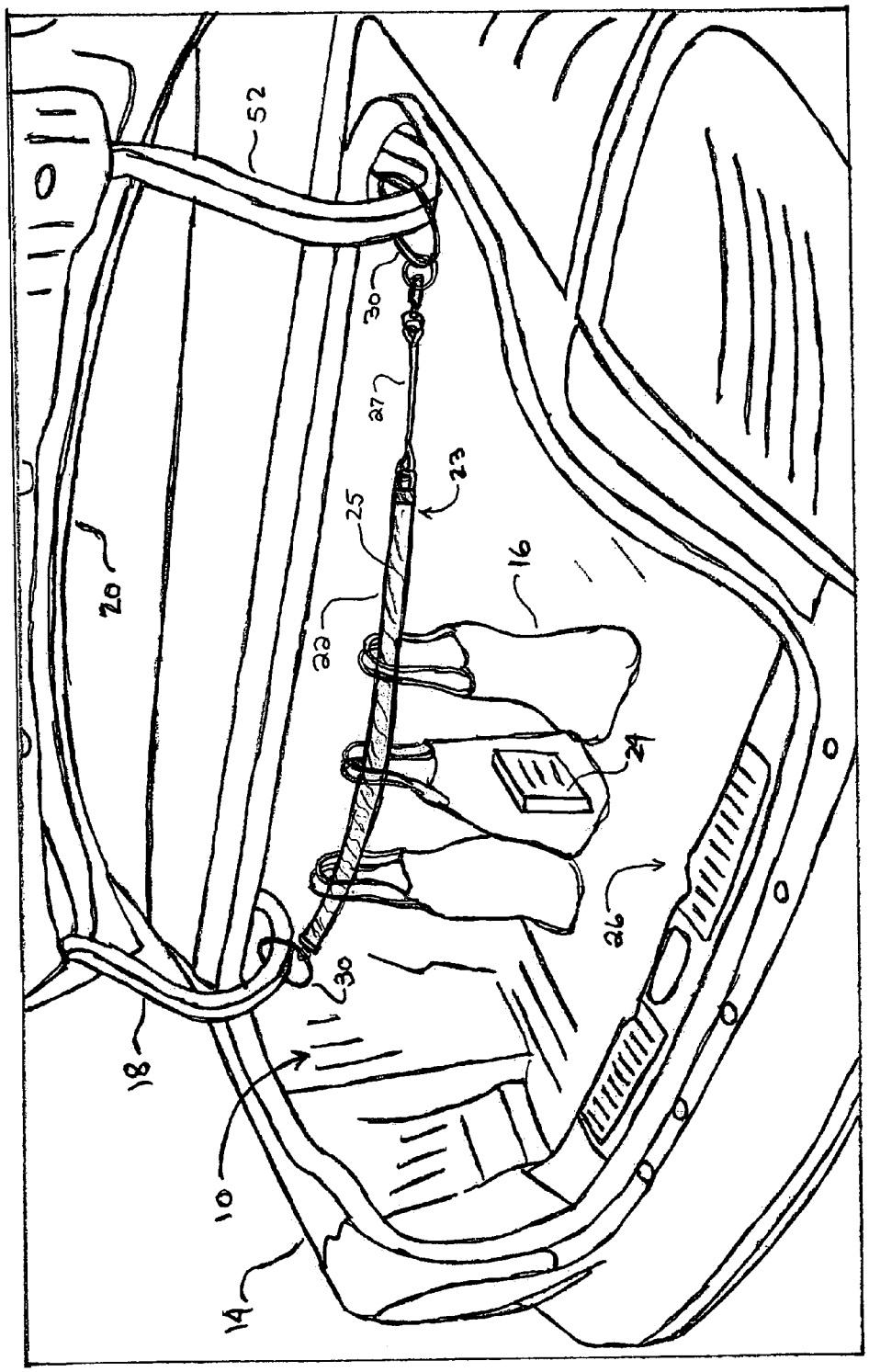
FIG. 1 is a perspective view of a rearward portion of an automobile trunk within which a grocery bag holder of the present invention for supporting loaded grocery bags is mounted.

FIG. 1 shows a perspective view of an automobile 14 enclosing a cargo compartment (trunk) 10. The trunk lid 20 is attached to the automobile 14 via two trunk hinges 18 and 52. Between the trunk hinges 18 and 52 is attached one embodiment of a bag holder of the present invention, device 22 for holding grocery bags 16 sitting on the floor 26 of the trunk 10 so that the groceries 24 stay in the bags 16. The device 22 shown in FIG. 1 comprises a band portion 23 comprised of a generally inelastic cloth webbing belt 25 and a generally elastically stretchable cord 27 joined to the cloth webbing belt by engaging loops. Device 22 attaches to trunk hinges 18 and 52 via connection by known means to slideable hinge rings, such as cable ties 30. Cable ties 30 can be plastic, adjustable ties as are commonly known and used to hold bundled wires, for example. Cable ties can be fixed in a closed loop and adjusted to a certain diameter. Once adjusted the cable ties need not be readjusted with each use. In a preferred embodiment, cable ties are adjusted to have a circumference sufficiently great so as to permit the ties to slide easily on trunk hinges 18 and 52. In another embodiment slideable hinge rings can be split metal rings of the type that are commonly used for key chains, adjustable hose clamp-type devices, twist-tie-type devices, or any other of devices that can be made into a loop around hinges 18 and 52 so as to provide for a slideable connection for device 22. Device 22 can be attached to slideable hinge rings, such as cable ties 30, by any of known connection means, such as by clips, clasps, quick-release connectors, rings, hooks, or other known means for making releasable connections. For example, slide clips as are commonly used on the ends of dog leashes to connect to dog collars can be used. It can be appreciated that as long as grocery bag holding device 22 is maintained relatively taut and the slideable hinge rings can slide freely along the trunk hinges 18 and 52, that even when the trunk is closed, the mouths of the grocery bags will still be maintained substantially above the trunk floor 26 and hence the groceries 24 will remain in the bags. In field trials, the device has consistently kept groceries in bags regardless of how severely the vehicle was driven.

Figure 2:
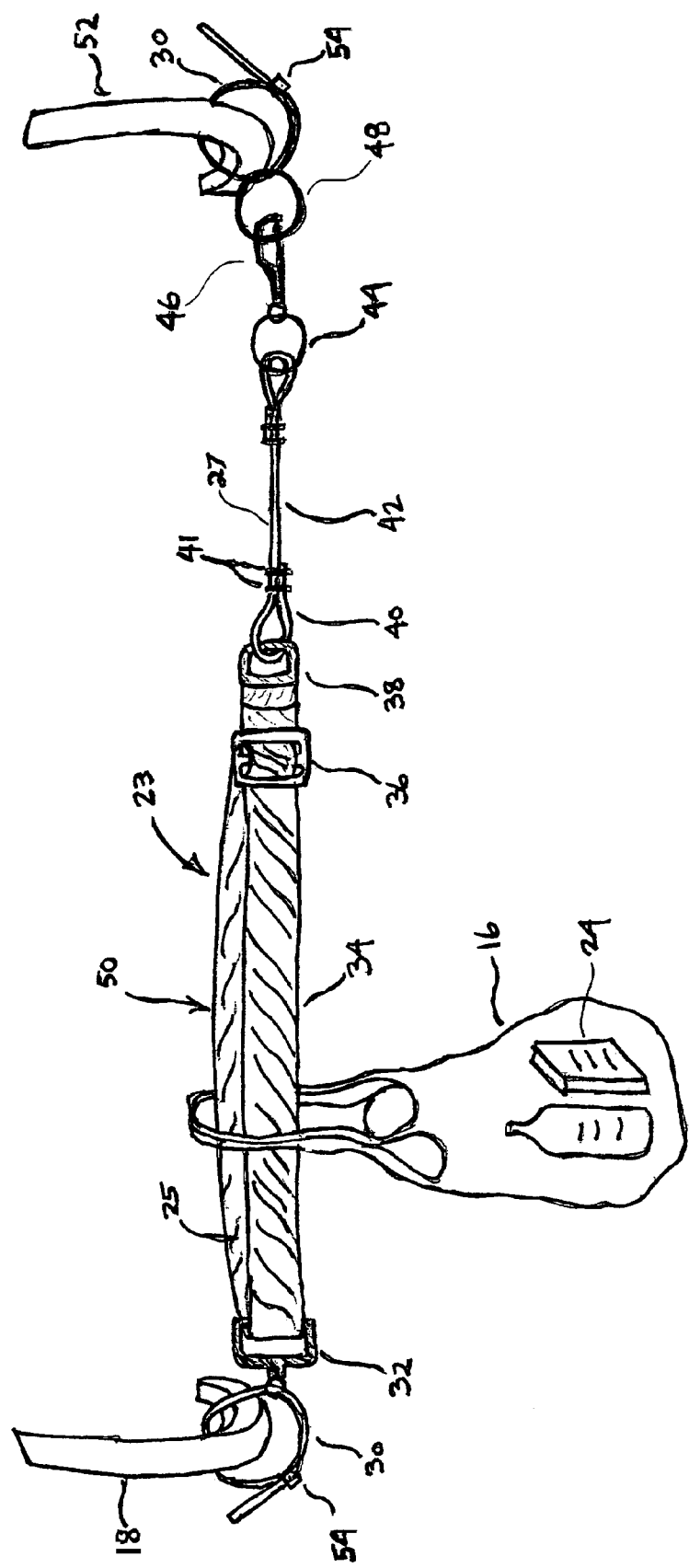
FIG. 2 is a perspective view of one embodiment of a grocery bag holder according to the present invention employing an adjustable webbing assembly and elastic cord.

FIG. 2 shows a perspective view of one embodiment of a grocery bag holder 50 according to the present invention wherein the band 23 comprises an adjustable webbing assembly 25 and elastic cord 27. The holder 50 is attached to the left side trunk hinges 18 via a releasable cable tie 30 which can be reopened by pressing on a release tab 54. Releasable cable ties are readily available such as Nelco products NT-1-50R-9-M. Cable tie 30 holds the left side of the grocery bag holder 50 by passing through a snap loop 32. The grocery bag holder 50 is adjustable via webbing 34 and slide 36 in such a way that the total length can be varied by a two to one ratio. Prior to extending, the bag holder 50 can be between about 25 and 35 inches long when in a non-extended, straightened condition. By designing the overall length of the holder 50 to be approximately 28 inches in the non-extended position, it has been found by testing that the device can accommodate all sizes of U.S. car trunks regardless of year of manufacture. Webbing 34 is attached to D-ring 38 that is in turn attached to a length of elastic shock (bungee) cord 42 via loop 40. Loops 40 are held closed via hog rings 41; hog rings are commonly used in the industry for securing cord and rope. Shock cord 42 is in turn attached to snap hook 46 via split ring 44. Grocery bag holder 50 attaches to the right side trunk hinge 52 by connecting to rigid plastic o-ring 48 that is held to the trunk hinge 52 via another releasable cable tie 30.

As can be appreciated based on the description herein, when slide 36 is adjusted to a length such that snap hook 46 is approximately five inches from o-ring 48, attaching snap hook 46 to o-ring 48 will result in shock cord 42 being stretched from it's normal position. The stretched state of shock cord 42 will result in a tension in grocery bag holder 50 such that the handles and openings of grocery bags 16 will stay substantially above the trunk floor 26. When standard ¼ inch shock cord is used in such a manner, a stretching of 80% of the shock cord length results in a force of between 5 and 10 pounds which is suitable for the average person to be able to easily attach snap hook 46 to o-ring 48.

It can be appreciated that the present invention takes up very little trunk space as a result of its low profile design and the manner in which it attaches between trunk hinges 18 and 52. Since the trunk hinges are substantially above the trunk floor 26, the present invention can easily coexist with other cargo and does not necessarily need to be removed in order to place other items in the trunk. The use of releasable cable ties 30 allows the device to be easily removed when the user desires and owing to the simple, low profile design, the device can easily be stored in a glove compartment or some other area of the vehicle.

In operation, the user places the grocery bags 16 on the trunk floor 26 and grasps the handles of the grocery bags, either individually or all the bags simultaneously in one hand. With the other hand the user then passes snap hook 46 through the bag handles and then connects it to o-ring 48. Because of the linear nature of the design of the device, and the fact that it does not use either individual hooks or compartments, the number of bags that can be accommodated by the device is limited only by the distance between the trunk hinges. In trials, the device has easily accommodated as many as 15 grocery bags. To remove the grocery bags the user simply disconnects snap hook 46 and pulls the entire assembly back through the bags in one motion. Snap hook 46 can then be reattached to o-ring 48 for storage until the next use. It can be appreciated from the above description of the operation of the invention that the design allows for easy deployment and removal of grocery bags. The components used in this embodiment are commercially available from a number of companies that specialize in webbing, shock cord and associated components such as National Webbing Products Company of Garden City Park, N.Y.

Figure 3:
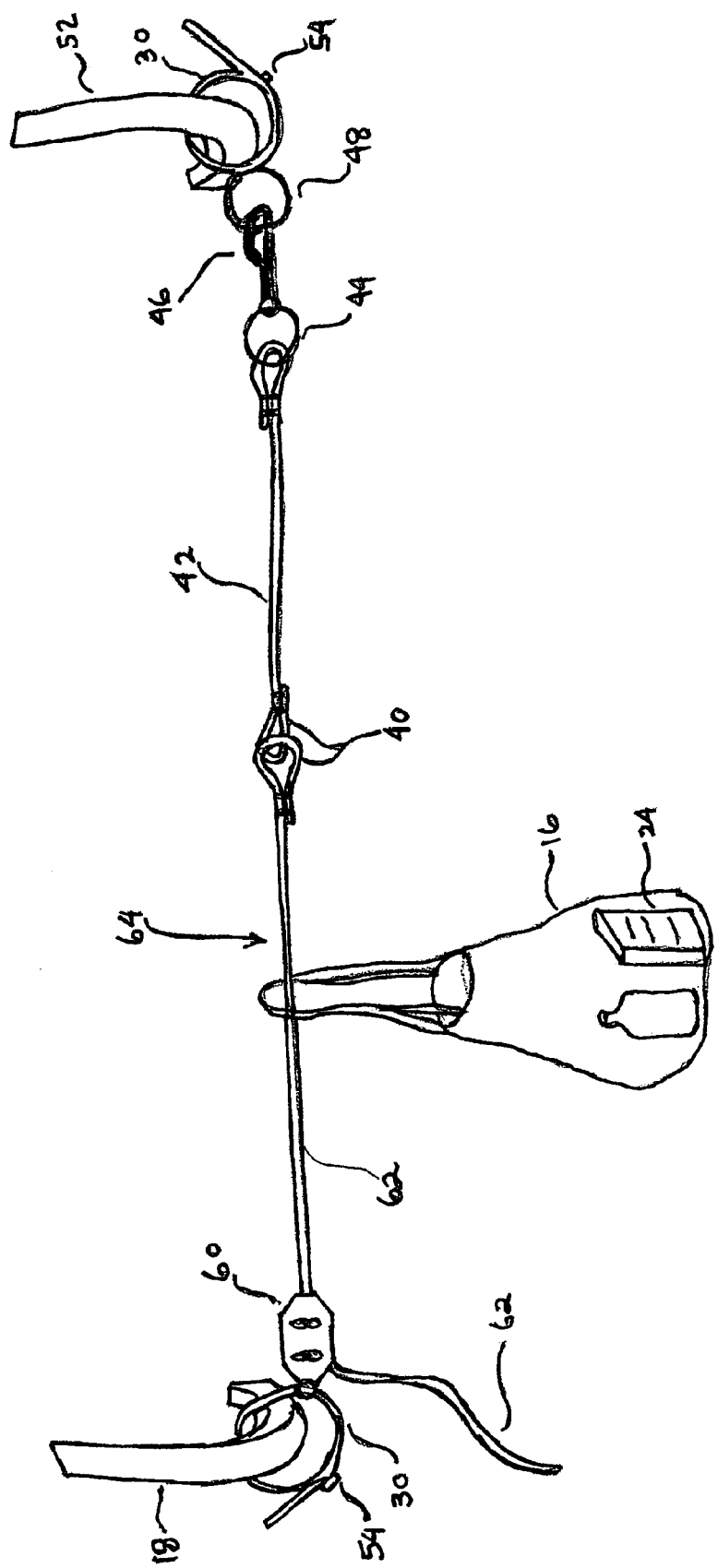
FIG. 3 is a perspective view of an embodiment of the present invention employing an adjustable rope clamp.

FIG. 3 is a perspective view of an alternate embodiment of the present invention employing an adjustable rope clamp. As in the previous embodiment, the grocery bag holder 64 is attached to the left side trunk hinge 18 via a releasable cable tie 30 which can be reopened by pressing release tab 54. Cable tie 30 holds the left side of grocery bag holder 64 by passing through loop in adjustable rope clamp 60 that allows rope to slide through its body and be secured once the desired length of rope is adjusted. Nylon rope 62 passes through and is held by adjustable rope clamp 60 in such manner that it is securely and firmly held. The excess rope can either be left to dangle or cut away for neatness. Rope clamp 60 allows the assembly to be adjusted for any and all sizes of car trunks. Nylon rope 62 connects to shock cord 42 via loops 40. Shock cord 42 is in turn attached to snap hook 46 via split ring 44. The use of both nylon rope 62 and shock cord 42 allows the device to be rigid yet maintain a constant tension regardless of the size of the car trunk. Grocery bag holder 64 attaches to the right side trunk hinge 52 by connecting to rigid plastic o-ring 48 that is held to the trunk hinge 52 via another releasable cable tie 30.

As can be appreciated based on the description herein, this embodiment of the invention allows for similar function as the previous embodiment. The device can easily coexist with cargo in the trunk area, takes up little space when not in use, is easily removable, accommodates a variable number of grocery bags and can be adjusted to fit any size car trunk.

Figure 4:
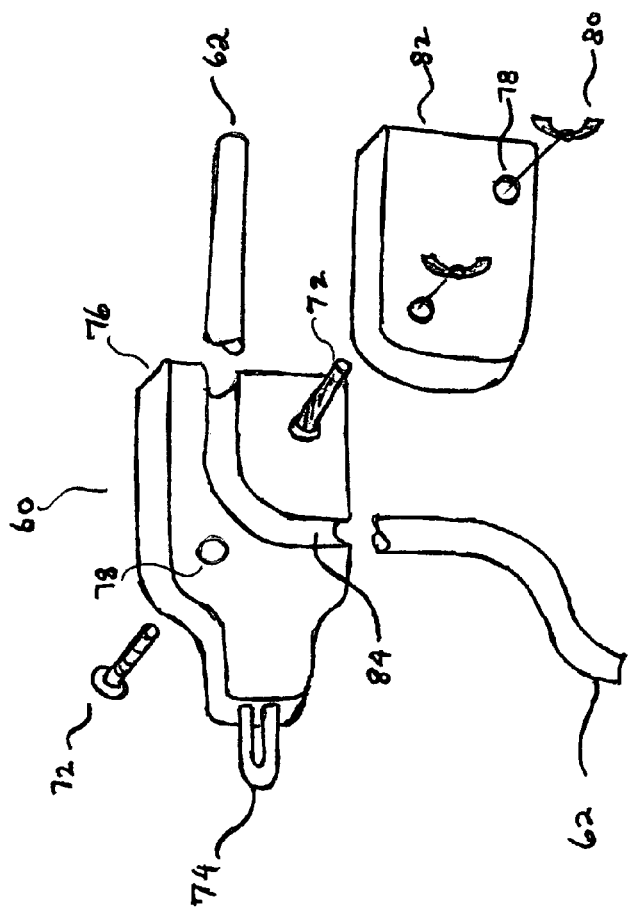
FIG. 4 is a detailed perspective view of the adjustable rope clamp of FIG. 3.

FIG. 4 is a detailed perspective view of the construction of the adjustable rope clamp. Rope clamp 60 is constructed of two pieces. Main body 76 contains a curved channel 84, two holes 78 and a rigid mounting loop 74. Similarly, tension plate 82 contains two holes 78. Cord or rope 62 lies inside of channel 84. Bolts 72 extend through holes 78 in both main body 76 and tension plate 82 and are tightened by hand with wing nuts 80. It can be appreciated from the figure that if rope clamp is designed such that channel 84 is slightly smaller than cord 62, then cord 62 will be held firmly in place when tension plate 82 is tightened against main body 76 by tightening wing nuts 80. As can be appreciated from the above description, the use of the adjustable rope clamp 60 allows grocery bag holder 64 to be easily adjusted to any size car trunk.

While the above description contains many specificities, these should not be construed as limitations on the scope of the invention, but rather as illustrative of exemplary and preferred embodiments thereof. Many other variations are possible without departing from the spirit and scope of the invention as disclosed. Accordingly, it is intended to cover in the appended claims all such variations, changes, and modifications that are within the scope of this invention.

What is claimed is:

1. In combination, a bag holder and vehicle trunk comprising a trunk lid having trunk hinges which attach the trunk lid to the vehicle, the bag holder comprising:
   a. a band portion having two ends, said band portion being at least partially elastically stretchable and of sufficient length when said partially elastically stretchable band portion is partially stretched so as to be held in tension when said ends are connected to respective trunk hinges;
   b. a pair of slideable hinge rings and connection means connecting one of the pair of said hinge rings to each end of said band portion, each of said slideable hinge rings having a sufficient circumference so as to permit encircling of said trunk hinges.

2. The bag holder of claim 1, wherein said slideable hinge rings comprise cable ties.

3. The bag holder of claim 2, wherein said cable ties are releasable cable ties.

4. The bag holder of claim 1, wherein said band portion has length and said length is adjustable.

5. The bag holder of claim 1, wherein said bag holder has a length of between about 25 and 35 inches when in a non-extended, straightened condition.

6. The bag holder of claim 1, wherein said partially elastically stretchable band portion comprises shock cord.

7. The bag holder of claim 6, wherein said band portion further comprises adjustable webbing.

8. The bag holder of claim 1, wherein said bag holder comprises an adjustable rope clamp.

9. The bag holder of claim 1, wherein said connection means includes releasable fasteners chosen from the group consisting of clips, clasps, and hooks.

10. In combination, a bag holder and a vehicle trunk comprising a trunk lid having trunk hinges which attach the trunk lid to the vehicle, the bag holder comprising:
 a. a band portion having two ends, said band portion comprising adjustable webbing connected by a D-ring to an elastically stretchable portion, said band portion being of sufficient length when said elastically stretchable portion is partially stretched so as to be held in tension when said ends are connected to respective trunk hinges.

11. The bag holder of claim 10, wherein said cable ties are releasable cable ties.

12. The bag holder of claim 10, wherein said band portion has length and said length is adjustable.

13. The bag holder of claim 10, wherein said bag holder has a length of between about 25 and 35 inches when in a non-extended, straightened condition.

14. The bag holder of claim 10, wherein said elastically stretchable portion comprises shock cord.

15. The bag holder of claim 10, wherein said connection means includes releasable fasteners chosen from the group consisting of clips, clasps, and hooks.

16. In combination, a bag holder and a vehicle trunk comprising a trunk lid having trunk hinges which attach the trunk lid to the vehicle, the bag holder comprising:
 a. a band portion having two ends, said band portion comprising adjustable webbing connected by a D-ring to an elastically stretchable shock cord, said webbing adjustable by a slide adjustment in a ratio of about 2 to 1 to be of sufficient length when said elastically stretchable shock cord is partially stretched sa as to be held in tension when said ends are connected to respective trunk hinges,
 b. a pair of cable ties, and a pair of releasable slide clips, each connecting one cable tie to each end of said band portion, each cable tie having a length sufficient to be closed into a loop having a sufficient circumference so as to permit encircling of said trunk hinges.

17. The bag holder of claim 16, wherein said cable ties are releasable cable ties.

18. The bag holder of claim 16, wherein said bag holder has a length of between about 25 and 35 inches when in a non-extended, straightened condition.

* * * * *